(12) United States Patent
Someya et al.

(10) Patent No.: US 6,171,622 B1
(45) Date of Patent: Jan. 9, 2001

(54) MINERAL-CONTAINING FUNCTIONAL BEVERAGE AND FOOD AND METHOD OF PRODUCING THE SAME

(75) Inventors: Nobuo Someya, Tokyo; Katsumi Imada, Funabashi; Norio Satoh, Shiraoka-machi; Hideo Someya, Tokyo, all of (JP)

(73) Assignee: Marine Bio Co., Ltd., Tokyo (JP)

( * ) Notice: Under 35 U.S.C. 154(b), the term of this patent shall be extended for 0 days.

(21) Appl. No.: 09/205,701

(22) Filed: Dec. 4, 1998

(51) Int. Cl.[7] .................................................... A23L 1/304
(52) U.S. Cl. ............................ 426/74; 426/384; 426/471; 426/590
(58) Field of Search .............................. 426/74, 590, 471, 426/384

(56) References Cited

FOREIGN PATENT DOCUMENTS

2262984 * 11/1987 (JP) ....................................... 426/74
2268671 * 11/1990 (JP) ....................................... 426/74

* cited by examiner

*Primary Examiner*—Helen Pratt
(74) *Attorney, Agent, or Firm*—Birch, Stewart, Kolasch & Birch, LLP

(57) ABSTRACT

A novel mineral-containing functional beverage is produced by adding weathered hermatypic coral to a water solution of an oxide or/and carbonate of an alkaline earth metal, such as calcium or magnesium. In particular, the ratio of the calcium or magnesium oxide or/and carbonate to the weathered hermatypic coral is from 0.01 to 1 part of the former to from 5 to 9.99 parts of the latter. A powdered mineral-containing functional food is produced by subjecting the water solution to spray drying or freeze drying.

8 Claims, No Drawings

MINERAL-CONTAINING FUNCTIONAL BEVERAGE AND FOOD AND METHOD OF PRODUCING THE SAME

BACKGROUND OF THE INVENTION

The present invention relates to a novel mineral-containing functional beverage and food and also relates to methods of producing the mineral-containing functional beverage and food.

As is generally known, calcium is one of elements important to living bodies and regarded as essential for the formation of bones, teeth, blood and so forth. Lack of calcium can lead to an attack of a disease such as osteoporosis or a disease of a circulatory organ. The recent progress in dietetics has revealed that the presence of magnesium is necessary when calcium is utilized in the body, and it is said that an ideal ratio of magnesium to calcium is 1:2. Under these circumstances, health foods containing calcium and magnesium are developed in the present state of the art. These foods are provided in the form of solutions by dissolving oxides or carbonates of calcium or magnesium in an inorganic acid or an organic matter to form water-soluble solutions, or in the form of powdered foods by processing the solutions into powders. However, in a case where these inorganic compounds are dissolved in an inorganic acid, the resulting water solution becomes a strong acid salt, which is unfavorable. In a case where the inorganic compounds are dissolved in an organic acid, the resulting water solution forms a precipitate and gets cloudy in a short time. Consequently, the commercial value is lost.

SUMMARY OF THE INVENTION

In view of the above-described circumstances, the present inventors conducted exhaustive studies, and as a result, we found that if the inorganic compounds are dissolved in an organic acid, together with weathered hermatypic coral, a clear water solution can be maintained independently of the pH. The present invention was accomplished on the basis of this finding.

To prepare water solutions of oxides or carbonates of alkaline earth metallic elements, e.g. Ca and Mg, the oxides or carbonates are usually dissolved in an organic acid, e.g. lactic acid, citric acid, gluconic acid, or malic acid. Because the stability constants of Ca, Mg and the organic acids are low, the compounds are gradually hydrolyzed in the weak acid, neutral and weak alkali regions. As a result, hydroxides of Ca and Mg precipitate.

The present inventors discovered that the unfavorable precipitation is prevented by adding weathered hermatypic coral into the above-described systems.

Accordingly, the prevent invention provides a alcium- and/or magnesium-containing functional beverage herein when an oxide or/and carbonate of an alkaline arth metal, such as calcium or magnesium, are dissolved in water to form a water solution, weathered hermatypic coral is added to the water solution.

In the mineral-containing functional beverage, the ratio of the calcium or magnesium oxide or/and carbonate to the weathered hermatypic coral is preferably from 0.01 to 1 part of the former to from 5 to 9.99 parts of the latter.

In the mineral-containing functional beverage, the oxide or/and carbonate of calcium or magnesium may be used alone or in the form of a mixture.

In addition, the present invention provides a powdered mineral-containing functional food prepared by subjecting the above-described water solution to spray drying or freeze drying.

In addition, the present invention provides a method of producing a calcium- and/or magnesium-containing functional beverage, in which when an oxide or/and carbonate of an alkaline earth metal, such as calcium or magnesium, are dissolved in water to form a water solution, weathered hermatypic coral is added to the water solution.

In the mineral-containing functional beverage producing method, the ratio of the calcium or magnesium oxide or/and carbonate to the weathered hermatypic coral is preferably from 0.01 to 1 part of the former to from 5 to 9.99 parts of the latter.

In the mineral-containing functional beverage producing method, the oxide or/and carbonate of calcium or magnesium may be used alone or in the form of a mixture.

In addition, the present invention provides a method of producing a powdered mineral-containing functional food by subjecting the above-described water solution to spray drying or freeze drying.

DETAILED DESCRIPTION OF THE INVENTION

The present invention will be described below in detail. The term "weathered hermatypic coral" as used herein means natural corallite and coral sand (sand-shaped corallite). As sources of Ca and Mg supply, oxides (CaO and MgO) and carbonates ($CaCO_3$ and $MgCO_3$) of these elements are mainly used. These compounds may be used alone or in the form of a mixture. As organic acids, those specified as food additives, for example, lactic acid, citric acid, and gluconic acid, are used as mentioned above.

Let us describe the present invention, taking the case of CaO as an example. First, CaO is dissolved in an organic acid in chemically equal quantities to form a solution. Weathered hermatypic coral dissolved in an organic acid is added to the solution of CaO, thereby enabling a durable, clear water solution to be obtained. In the case of MgO and carbonates of Ca and Mg, it is also possible to obtain desired water solutions by following a procedure similar to the above. Regarding the ratio between the two constituents to be mixed together to form a water solution, the water solution should be prepared so as to contain from about 5 to about 9.99 parts of weathered hermatypic coral to from 0.01 to 5 parts of such an inorganic compound.

The acidity or alkalinity of the water solution in the present invention is in the range of from weak acid to neutral and weak alkali regions. However, there is no specific restriction thereon.

The water solution obtained may be solidified or powdered by freeze drying or spray drying.

It is considered that the amazing action of weathered hermatypic coral is derived from decomposition products of various inorganic and organic compounds contained therein. However, this has not yet been proved.

Examples will be shown below. However, these are merely examples for describing the present invention, and the present invention is not limited by any of these examples.

EXAMPLE 1

(lactic acid×CaO+lactic acid×coral)

1) To 30 grams of lactic acid (55%), 500 milliliters of water is added to dilute the lactic acid, and 10 grams of calcium oxide is introduced into the diluted lactic acid and dissolved therein by heating to about 80° C.

After cooling, a supernatant liquid is taken and allowed to stand. Let us call it "solution A" tentatively.

2) Next, to 110 grams of lactic acid (55%), 2 liters of water is added, and 60 grams of coral powder is introduced into the solution and dissolved therein by heating to about 80° C.

After cooling, a supernatant liquid is taken after an insoluble matter has sedimented. Let us call the supernatant liquid "solution B" tentatively.

3) The solutions A and B are mixed together in the ratio of 1:10 (A:B). Let us call the resulting solution "solution C" tentatively.

4) After about one month, the solution A got cloudy by hydrolysis, whereas the solution C maintained its clarity.

EXAMPLE 2
(citric acid×magnesium carbonate+citric acid×coral)

1) 18 grams of citric acid is dissolved in 1.2 milliliters of water. 10 grams of magnesium carbonate is introduced into the solution and dissolved therein by heating to about 50° C.

After cooling, a supernatant liquid is taken and allowed to stand. Let us call it "solution A" tentatively.

2) Next, 30 grams of citric acid is dissolved in 2 liters of water. 24 grams of coral powder is introduced into the solution and dissolved therein by heating to about 50° C.

After cooling, a supernatant liquid is taken after an insoluble matter has sedimented. Let us call the supernatant liquid "solution B" tentatively.

3) The solutions A and B are mixed together in the ratio of 1:50 (A:B). Let us call the resulting solution "solution C" tentatively.

4) After about one month, the solution A got cloudy by hydrolysis, whereas the solution C maintained its clarity.

EXAMPLE 3

The solutions obtained in the above-described Examples 1 and 2 were subjected to spray drying. As a result, it was possible to obtain powders from the solutions.

Thus, it is possible according to the present invention to provide a beverage and food that make it possible to take calcium, which is regarded as essential for man, in the presence of magnesium, which is said to be necessary when calcium is utilized in the body, in the ideal ratio of magnesium to calcium, i.e. 1:2. In particular, the present invention enables a clear water solution to be maintained independently of the pH and is therefore suitable for use as a beverage or food additive.

Advantageous Effects of the Invention

Thus, it is possible according to the present invention to provide a beverage and food that make it possible to take calcium, which is regarded as essential for man, in the presence of magnesium, which is said to be necessary when calcium is utilized in the body, in the ideal ratio of magnesium to calcium, i.e. 1:2. In particular, the present invention enables a clear water solution to be maintained independently of the pH and is therefore suitable for use as a beverage or food additive.

What is claimed is:

1. A stabilized calcium- and/or magnesium-containing functional beverage comprising:

(A) a water solution of an oxide and/or carbonate of calcium and/or magnesium; and (B) a water solution of weathered hermatypic coral.

2. A mineral-containing functional beverage according to claim 1, wherein a ratio of the calcium and/or magnesium oxide and/or carbonate used to make solution (A) to the weathered hermatypic coral used to make solution (B) is from 0.01 to 1 part of the former to from 5 to 9.99 parts of the latter.

3. A mineral-containing functional beverage according to claim 1, wherein solution (A) is a mixture of the oxide and/or carbonate of calcium and magnesium.

4. A mineral-containing functional beverage according to claim 1, wherein the water solutions are subjected to spray drying or freeze drying.

5. A method of producing a calcium- and/or magnesium-containing functional beverage, comprising dissolving an oxide and/or carbonate of calcium and/or magnesium in a solution of water and an acid, to form a water solution (A);

dissolving a weathered hermatypic coral in another solution of water and an acid, to form a water solution (B);

mixing solution (B) with solution (A).

6. A method of producing a mineral-containing functional beverage according to claim 5, wherein a ratio of the calcium and/or magnesium oxide and/or carbonate used to make solution (A) to the weathered hermatypic coral used to make solution (B) is from 0.01 to 1 part of the former to from 5 to 9.99 parts of the latter.

7. A method of producing a mineral-containing functional beverage according to claim 5, wherein solution (A) is a mixture of the oxide and/or carbonate of calcium and magnesium.

8. A method of producing the functional beverage of claim 5, wherein the solutions are subjected to spray drying or freeze drying.

\* \* \* \* \*